United States Patent
Meritt-Powell

(10) Patent No.: US 7,029,583 B2
(45) Date of Patent: Apr. 18, 2006

(54) HOSE CLASP FOR A POOL CLEANER FILTER BAG

(75) Inventor: Michael A. Meritt-Powell, Oceanside, CA (US)

(73) Assignee: Polaris Pool Systems Inc., Vista, CA (US)

( * ) Notice: Subject to any disclaimer, the term of this patent is extended or adjusted under 35 U.S.C. 154(b) by 50 days.

(21) Appl. No.: 10/917,892

(22) Filed: Aug. 13, 2004

(65) Prior Publication Data
US 2005/0040094 A1    Feb. 24, 2005

Related U.S. Application Data

(60) Provisional application No. 60/496,867, filed on Aug. 20, 2003.

(51) Int. Cl.
*B01D 29/27* (2006.01)
*E04H 4/16* (2006.01)

(52) U.S. Cl. ............... 210/232; 210/169; 15/1.7
(58) Field of Classification Search ............ 210/232, 210/169; 15/1.7
See application file for complete search history.

(56) References Cited

U.S. PATENT DOCUMENTS

| | | | |
|---|---|---|---|
| 3,822,754 A | 7/1974 | Henkin et al. | |
| 4,558,479 A | 12/1985 | Greskovics et al. | |
| 4,575,423 A | 3/1986 | Alanis et al. | |
| 4,589,986 A | 5/1986 | Greskovics et al. | |
| 4,618,420 A | 10/1986 | Alanis | |
| D288,373 S | 2/1987 | Alanis | |
| D294,963 S | 3/1988 | Alanis et al. | |
| 4,880,531 A * | 11/1989 | Blake et al. | 210/169 |
| 5,863,425 A | 1/1999 | Herlehy et al. | |
| D409,341 S | 5/1999 | Van Etten et al. | |
| 6,241,899 B1 | 6/2001 | Ramos | |
| D468,067 S | 12/2002 | Stoltz et al. | |
| 6,665,900 B1 | 12/2003 | Wichmann et al. | |
| 6,740,233 B1 | 5/2004 | Stoltz et al. | |
| 2005/0040094 A1 * | 2/2005 | Meritt-Powell | 210/232 |

* cited by examiner

Primary Examiner—Thomas M. Lithgow

(57) ABSTRACT

An improved hose clasp for supporting a filter bag in a generally upright orientation on a pool cleaner as disclosed, for example, in U.S. Pat. Nos. 5,863,425; 4,558,479; and 3,822,754. The hose clasp includes a generally cylindrical split collar having separable free ends including a pair of radially outwardly extending clasp arms. The clasp arms are springably separable to permit placement of the split collar onto a supply hose or the like coupled to the pool cleaner. The clasp arms are notched to accommodate movement to an interlocked cross-over position, with a boss on one of the clasp arms protruding through a lock port in the other clasp arm. A leash member such as a ported tab carried by the filter bag is fitted over the boss in a position interposed between the interlocked clasp arms to support the filter bag relative to the supply hose.

7 Claims, 7 Drawing Sheets

HOSE CLASP FOR A POOL CLEANER FILTER BAG

This application claims the benefit of U.S. Provisional Application 60/496,867, filed Aug. 20, 2003.

BACKGROUND OF THE INVENTION

This invention relates generally to improvements in automatic pool cleaners and related accessories therefor, wherein the pool cleaner is designed for travel within a swimming pool or the like to dislodge and collect debris. More specifically, this invention relates to an improved support clasp for supporting a pool cleaner filter bag from a supply hose or the like connected to a pool cleaner. The support or hose clasp retains the filter bag in a generally upright orientation, and thereby prevents the bag from draping downwardly over and about the pool cleaner where it can otherwise become entangled in the cleaner wheels and/or scrape against pool surfaces.

Automatic swimming pool cleaners are generally well known in the art for use in maintaining a swimming pool in an overall state of cleanliness. In this regard, residential and commercial swimming pools normally include a standard water filtration system including a main circulation pump and related main filter unit for filtering the pool water. The filtration system is typically operated for several hours on a daily basis to draw water from the pool for flow through the main filter unit and subsequent return circulation to the pool, wherein the filter unit includes an appropriate filter media for collecting and thus removing solid debris such as fine grit and silt, twigs, leaves, insects, and other particulate matter suspended within the pool water. Although such filtration systems function efficiently to collect suspended particulate, it has been recognized that some particulate tends to settle onto submerged pool floor and wall surfaces and thus is not removed by the standard filtration system. Automatic swimming pool cleaners have been developed and are widely used to assist in a more thorough cleaning of the pool by directly collecting such settled matter, and/or by re-suspending the settled matter so that it can be collected by the main filter unit.

More specifically, in one common form, the automatic swimming pool cleaner comprises a relatively compact wheeled housing adapted to travel randomly over submerged floor and wall surfaces of the pool. The cleaner is normally connected by a water supply hose or the like to the standard filtration system, such as by connection to the positive pressure discharge side of the system as described in U.S. Pat. Nos. 5,863,425; 4,558,479; 4,589,986; and 3,822,754, and copending U.S. Ser. No. 10/397,939. The filtration system provides a water flow through the supply hose to the cleaner, wherein this water flow is typically used to create or induce an upwardly directed suction flow through a suction mast for vacuuming grit and debris through the suction mast into a porous mesh filter bag mounted on an upper or downstream end thereof. The water flow through the pool cleaner may also be used to power an hydraulic drive means which causes the cleaner to travel about within the swimming pool.

The filter bag is designed for periodic removal from the pool cleaner suction mast so that collected debris accumulated therein can be discarded. In some filter bag designs, the debris is emptied from the bag which is then re-mounted onto the pool cleaner. In other filter bags, the filter bag is formed from a porous material designed for disposal with the collected debris after a single use cycle, whereupon a replacement filter bag is mounted onto the pool cleaner for resumed cleaner operation. Exemplary filter bags and related techniques for removable mounting onto the pool cleaner suction mast are shown and described in U.S. Pat. Nos. 4,618,420; D288,373; 4,575,423; D294,963; 4,589,986; 5,863,425; D409,341; D468,067; and 6,241,899; and in copending U.S. Ser. No. 10/400,118, now U.S. Pat. No. 6,740,233.

During normal operation of the pool cleaner, the upward flow of water and entrained debris through the suction mast passes upwardly into an open mouth of the filter bag. This upward flow of water has a sufficient flow rate to provide an hydraulic column which effectively orients and maintains the filter bag in a generally upright configuration at an upper side of the pool cleaner. The water column passes upwardly through the porous bag material for recirculation to the pool, whereas water-entrained particulate is captured and retained within the filter bag. In this upright orientation, the filter bag is spaced from external moving parts of the pool cleaner, such as traction drive wheels, whereby there is minimal risk of the filter bag becoming caught or entangled in such moving parts. In addition, the filter bag is spaced from adjoining pool surfaces of plaster and the like, whereby there is minimal risk of the bag scraping and wearing against such surfaces. However, when the pool cleaner is turned off, or the upward water column through the filter bag is otherwise interrupted, e.g., during a periodic back-up maneuver, the filter bag can drape downwardly over the pool cleaner to become entangled within the cleaner wheels, or to scrape against submerged pool surfaces. The likelihood of the filter bag falling downwardly over the pool cleaner increases with the mass of accumulated debris collected therein.

In the past, filter bags have often included means for removably supporting an upper end of the bag from the supply hose to prevent the bag from falling and draping downwardly over the pool cleaner. Such removable support means have included, e.g., Velcro-type straps designed to wrap about the supply hose, or alternately to connect with a part-circle or C-shaped clip that is slidably mounted onto the supply hose, while accommodating relatively quick and easy removal when the filter bag is removed from the pool cleaner for disposal of accumulated debris. In these designs, however, component wear in combination with prolonged exposure to water, sun and chemicals in a swimming pool environment can result in inadvertent separation of the filter bag from the supply hose particularly in response to increased weight attributable to collected debris. In addition, such removable support devices are often removed with the filter bag each time the bag is removed to discard the debris accumulated therein, whereby the removable support device is sometimes misplaced or inadvertently thrown away with the discarded debris.

There exists, therefore, a need for further improvements in and to filter bags for pool cleaners and related accessories for use therewith, particularly for removably supporting an upper end of the filter bag from a pool cleaner supply hose or the like, yet permitting quick and easy removal of the filter bag for disposal of collected debris. The present invention fulfills these needs and provides further related advantages.

SUMMARY OF THE INVENTION

In accordance with the invention, an improved support or hose clasp for removably supporting a filter bag in a generally upright orientation on a pool cleaner of the type disclosed, for example, in U.S. Pat. Nos. 5,863,425; 4,558, 479; 3,822,754 and copending U.S. Ser. No. 10/397,939, now U.S. Pat. No. 6,665,900. The support or hose clasp retains the filter bag in a generally upright orientation, and thereby prevents the bag from draping downwardly over and about the pool cleaner where it could otherwise become entangled in the cleaner wheels and/or scrape against pool surfaces.

The hose clasp generally comprises a cylindrical split collar having separable free ends defined respectively by radially outwardly extending first and second clasp arms. These clasp arms are normally oriented in an unlocked, face-to-face position where they are springably separable to open the split collar and thereby permit removable mounting of the split collar onto a supply hose or the like coupled to the pool cleaner, with the split collar preferably having a diametric size for relatively unrestricted sliding displacement along the supply hose. The clasp arms are notched to accommodate movement to an inverted cross-over position interlocked with each other, with a laterally extending boss on the first clasp arm protruding through a laterally open lock port formed in the second clasp arm. In this cross-over interlocked position, the first and second clasp arms are springably urged toward abutting relation for maintaining the boss in interlocked relation with the lock port.

The filter bag carries a leash member, such as a ported tab suitably mounted generally at an upper end thereof. This ported tab is received over the boss on said first clasp arm prior to reception of said boss through the lock port formed in said second clasp arm. Accordingly, with the clasp arms in interlocked relation, the ported tab on the filter bag is sandwiched or interposed between the first and second clasp arms.

Movement of said first and second clasp arms between said unlocked position and said interlocked position can be performed manually as a relatively quick and easy one-handed maneuver. When removal of the filter bag from the pool cleaner is indicated, e.g., to dispose accumulated debris, the clasp arms can be shifted from the interlocked position to the unlocked position to permit separation of the bag leash member such as the ported tab therefrom, without requiring removal of the split collar from the supply hose.

Other features and advantages of the invention will become more apparent from the following detailed description taken in conjunction with the accompanying drawings which illustrate, by way of example, the principles of the invention.

BRIEF DESCRIPTION OF THE DRAWINGS

The accompanying drawings illustrate the invention. In such drawings:

FIG. 6 is a fragmented perspective view showing an initial step for mounting the hose clasp onto a supply hose or the like;

FIG. 7 is a fragmented perspective view similar to FIG. 6, and illustrating a further step in mounting the hose clasp onto a supply hose or the like;

FIG. 8 is a fragmented perspective view similar to FIGS. 6–7, and showing the hose clasp mounted slidably onto a supply hose or the like;

DETAILED DESCRIPTION OF THE PREFERRED EMBODIMENT

Figure 1:
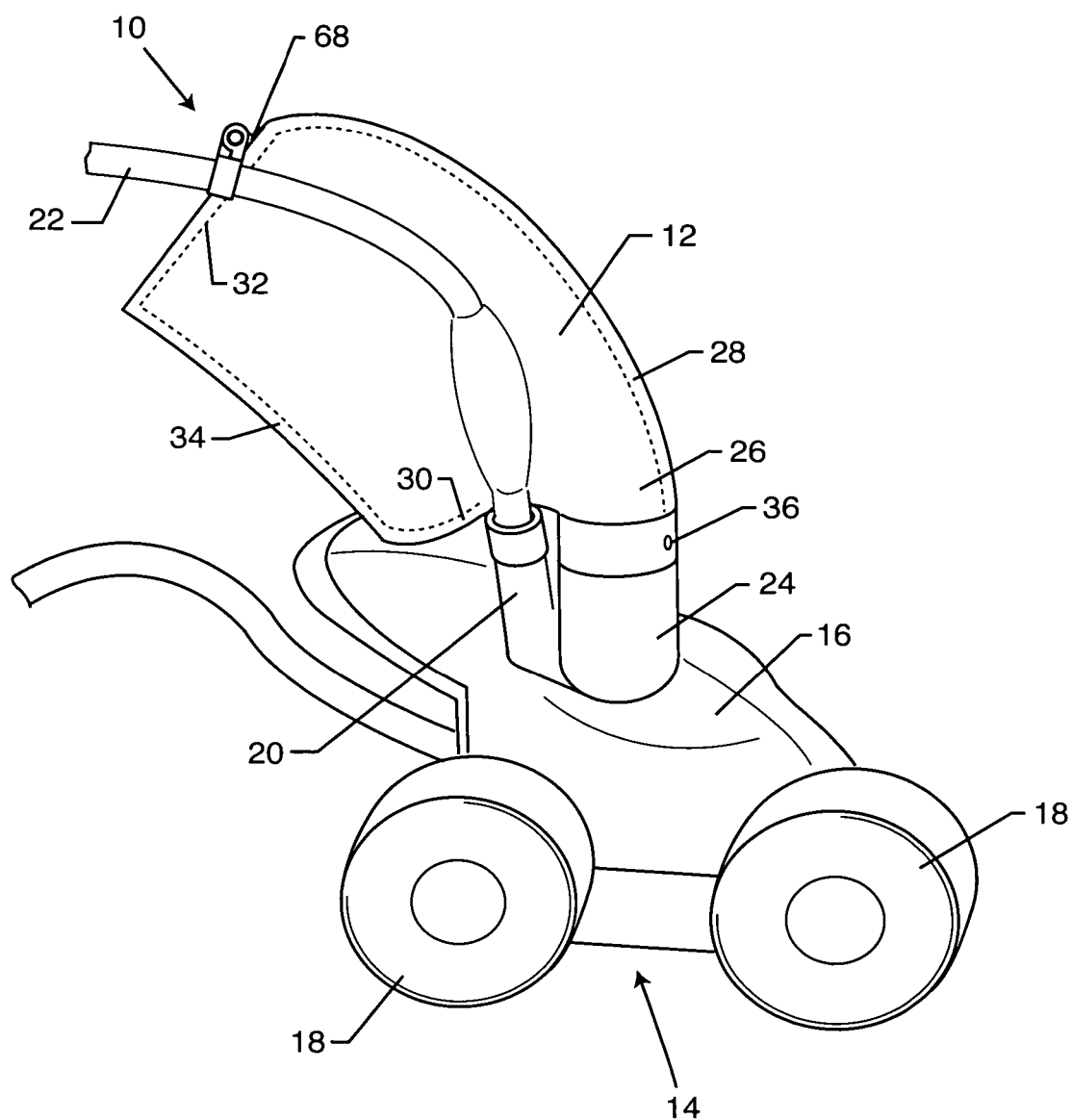
FIG. 1 is a perspective view of a pool cleaner having a filter bag with an upper end supported from a supply hose or the like by means of an improved hose clasp constructed in accordance with the novel features of the invention.

As shown in the exemplary drawings, an improved support or hose clasp referred to generally the reference numeral 10 is provided for use supporting an upper end of a filter bag 12 mounted on a pool cleaner 14. In operation, the pool cleaner 14 is designed for travel within a swimming pool (not shown) or the like to collect particulate debris such as sand and grit particles, leaves, twigs, and the like within the filter bag 12. The hose clasp 10 retains the filter bag 12 in a generally upright orientation, and thereby prevents the bag 12 from draping downwardly over and about the pool cleaner 14 where it could otherwise become entangled in the cleaner wheels and/or scrape against pool surfaces.

The improved hose clasp 10 of the present invention is designed for use with a conventional automatic swimming pool cleaner of the type adapted for substantially random travel throughout the volume of a swimming pool or the like to pick up and collect particulate debris within the filter bag 12, and/or to assist in suspending or re-suspending such particulate matter so that it can filtered from the pool water by a main filtration system (not shown). FIG. 1 depicts an exemplary pool cleaner 14 generally in accordance with the pool cleaner shown and described in U.S. Pat. No. D469,589 and copending U.S. Ser. No. 10/397,939, now U.S. Pat. No. 6,665,900, which are incorporated by reference herein. More particularly, the illustrative pool cleaner 14 comprises a relatively compact housing 16 carried on a plurality of wheels 18. An internal drive means (not shown) is provided for causing the pool cleaner 14 to travel about within the pool, traversing submerged pool floor and wall surfaces, with said internal drive means being typically powered hydraulically by a water flow coupled to a cleaner supply mast 20 via a supply hose 22 coupled to the main pool water filtration system (not shown). In one common form, the water flow is a positive pressure flow for hydraulically driving the internal drive means (not shown) and also for creating or inducing an upward suction or vacuum flow of water through a generally vertically oriented suction mast 24 on the pool cleaner 10 to vacuum particulate matter settled upon submerged pool surfaces. Alternative exemplary pool cleaners conforming generally hereto are shown and described in U.S. Pat. Nos. 5,863,425; 4,558,479; 4,589,986; and 3,822,754, which are also incorporated by reference herein.

The filter bag 12 is adapted for removable mounting onto a downstream or upper end of the suction mast 24, for receiving the upward column or flow of water and water-entrained debris discharged from the suction mast. In this regard, the filter bag 12 has a porous mesh construction to permit upward flow-through passage of this water flow, with minimal or no significant flow obstruction, for return circulation of this water flow to the body of water within the swimming pool. However, the mesh size of the porous filter bag 12 is chosen to capture and retain the water-entrained particulate debris. When desired, or when the filter bag 12 reaches a condition substantially filled with collected debris, the filter bag is removable from the pool cleaner suction mast 24 for disposal of the debris collected therein. Such disposal may comprise emptying the collected debris into a suitable waste or trash receptacle, followed by re-mounting of the filter bag 12 onto the pool cleaner. Alternately, the filter bag 12 may be designed for one-time use and disposal along with the collected debris, in which case a replacement filter bag 12 is mounted onto the suction mast 24 for resumed pool cleaner operation. Exemplary filter bags and related means for removable mounting onto the suction mast of a pool cleaner are shown and described in U.S. Pat. Nos. 4,618,420; D288,373; 4,575,423; D294,963; 4,589,986; 5,863,425; D409,341; D468,067; and 6,241,899; and in copending U.S. Ser. No. 10/400,118, now U.S. Pat. No. 6,740,233, which are incorporated by reference herein.

More particularly, with reference to the filter bag 12 shown in the illustrative drawings, the porous mesh filter bag material is shaped or fashioned to define a hollow bag interior forming a generally cylindrical and downwardly open mouth 26 at a front and lower end thereof. In this regard, FIG. 1 shows the bag mouth joined with an upwardly extending front seam or margin 28, and a rearwardly extending lower seam or margin 30. An upper end of the front seam or margin 28 is joined in turn to a rearwardly extending upper seam or margin 32, which is turn in joined at its rearmost end with a downwardly extending rear seam or margin 34 having its lower end joined to the rearmost end of the lower seam or margin 30. Each of these seams or margins 28, 30, 32 and 34 may comprise a sewn seam or otherwise include attachment means such as an adhesive or by direct welding of the material for connecting opposite sides of the bag together. Alternately, the bag material may be folded upon itself in other configurations, such as by providing a seamless upper margin as disclosed in U.S. Pat. No. 4,618,420.

The bag mouth 26 includes or is connected to means for removably mounting the filter bag 12 relative to the upper end of the pool cleaner suction mast 24, such as a mounting collar 36 of generally cylindrical shape. This mounting collar 36 thus removably supports the filter bag 12 with the mouth 28 thereof positioned over the pool cleaner suction mast 24, so that the upward column or flow of water and water-entrained debris passing through the suction mast is directed upwardly into the hollow interior of the filter bag.

In accordance with the invention, the hose clasp 10 is removably mounted onto the supply hose 22 or other suitable anchor structure disposed generally above the upper or downstream end of the suction mast 24, for supporting an upper end of the filter bag 12 in a manner to maintain the filter bag in a generally upright orientation on the pool cleaner 14. In this regard, during normal operation of the pool cleaner 14, the upwardly column of water and water-entrained debris flowing from the suction mast 24 into the interior of the filter bag normally maintains the filter bag in the desired upright orientation. Accordingly, during normal cleaner operation, the upper end of the filter bag 12 is substantially prevented from falling or draping downwardly onto the body 16 of the pool cleaner 14, where the filter bag can potentially become entrapped or entangled within the cleaner wheels 18. In addition, in the upright orientation, the filter bag is supported so that potentially abrasive or scraping contact with pool surfaces is substantially precluded. Such abrasive contact with pool surfaces can prematurely wear a fabric mesh filter bag, and may cause immediate failure of a lightweight disposable bag material. Importantly, the hose clasp 10 additionally supports the filter bag 10 in this desired, generally upright orientation when the upward hydraulic water column is interrupted, such as when the pool cleaner is turned off, or during a periodic back-up maneuver, etc.

Figure 2:
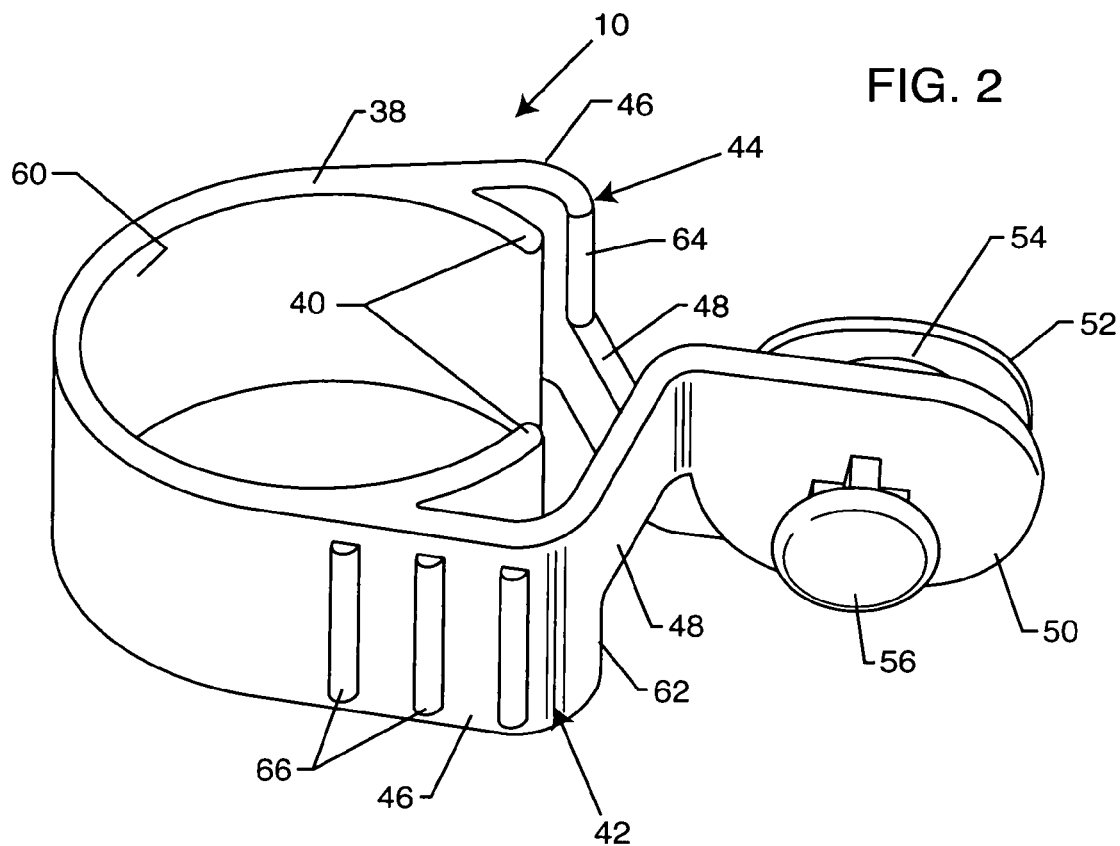
FIG. 2 is an enlarged perspective view of the hose clasp, and illustrating the hose clasp in an unlocked position.
Figure 3:
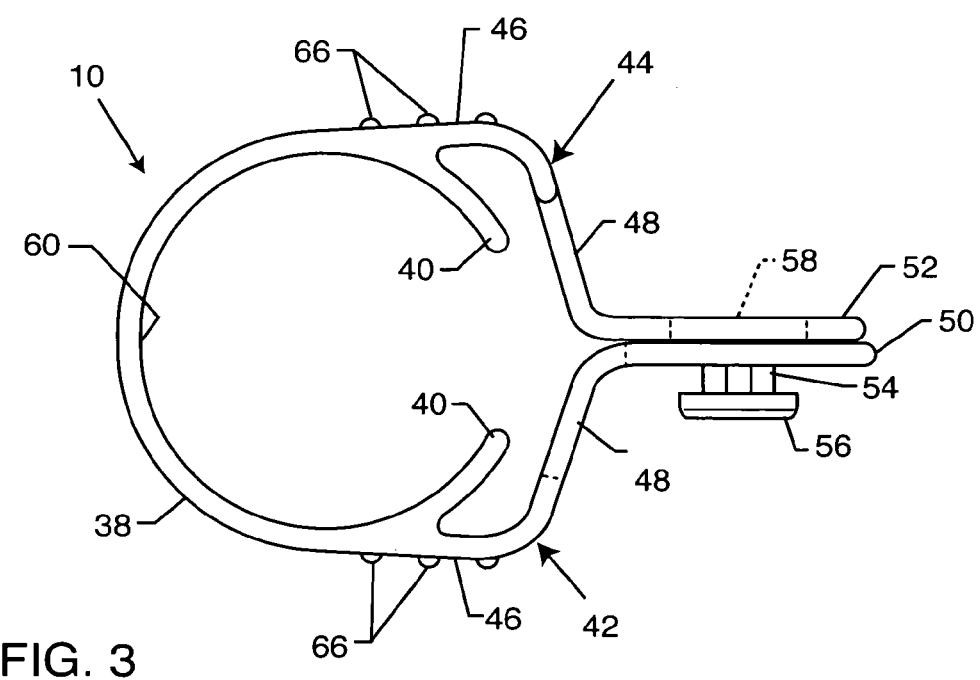
FIG. 3 is a top plan view of the hose clasp in an unlocked position.

As viewed best in FIGS. 2–3, the improved hose clasp 10 generally comprises a generally cylindrical, longitudinally split collar 38 formed conveniently as a unitary or one-piece plastic molding or the like from a material suitable for relatively long term usage in a swimming pool environment without significant physical or structural degradation. While a variety of plastic materials may be used, one preferred plastic material comprises an acetal-based plastic such as that available from E.I. DuPont de Nemours Company, Wilmington, Del., under the product name Delrin. Alternately, non-plastic materials such as stainless steel and the like, suitable for use in a swimming pool environment, may be used.

The split collar 38 defines a pair of separable free ends 40 defining a radially open or openable arcuate space to accommodate slip-on placement of the collar onto the supply hose 22 or the like, as will be described in more detail. As shown, the split collar 38 has a circumferential span on the order of about 300°, whereas the open space defined between the free ends 40 has an arcuate span on the order of about 60°. Alternately, if desired, the collar 38 may be slide-fit mounted onto the supply hose prior to supply hose connection to the pool cleaner.

A pair of first and second clasp arms 42 and 44 are formed on the collar 38 at respective locations substantially at or near said free ends 40. The two clasp arms 42 and 44 each include an inboard segment 46 extending generally tangentially outwardly from the collar 38 at opposite sides thereof near the free ends 40. The forwardmost ends of these inboard clasp arm segments 46 are joined to a corresponding pair of intermediate segments 48 which are turned to extend generally toward each other. These intermediate segments 48 of the two clasp arms 42 and 44 merge respectively with a pair of generally radially outwardly extending outboard segments 50 and 52 formed, in the as-molded condition, in generally face-to-face and closely-spaced, nearly abutting relation as viewed best in FIG. 3. The outboard segments 50, 52 of the two clasp arms 42, 44 carry interengageable lock members such as such as a boss 54 projecting laterally outwardly from a side face of the first clasp arm 42 in a direction opposite the second clasp arm 44 and including an enlarged distal end cap 56, and a laterally open lock port formed in the second clasp arm 44.

Figure 6:
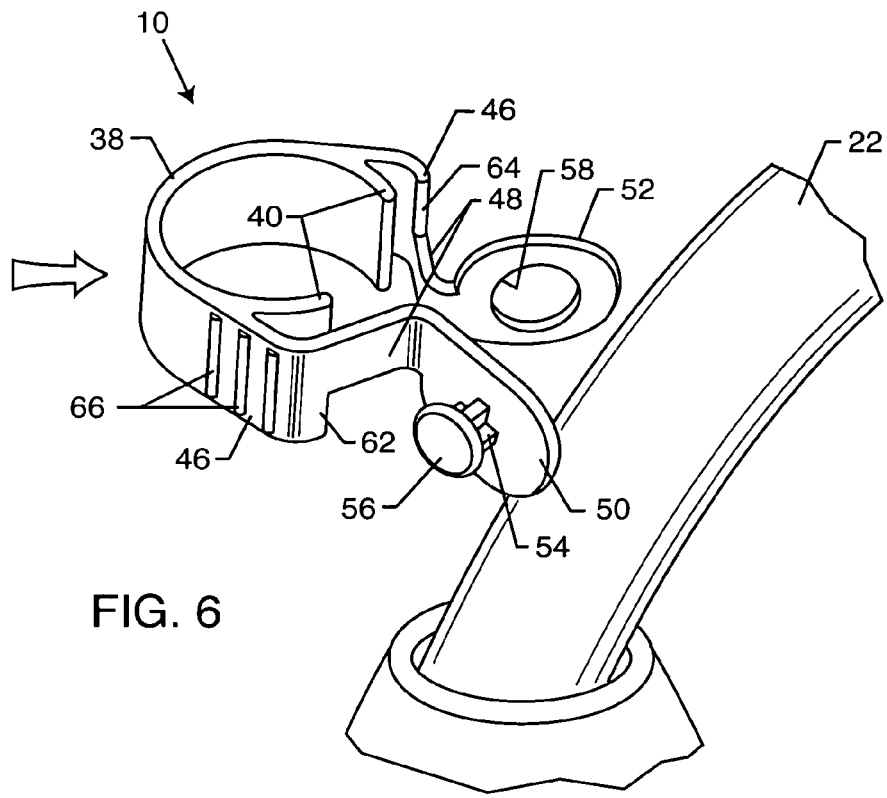
Figure 7:
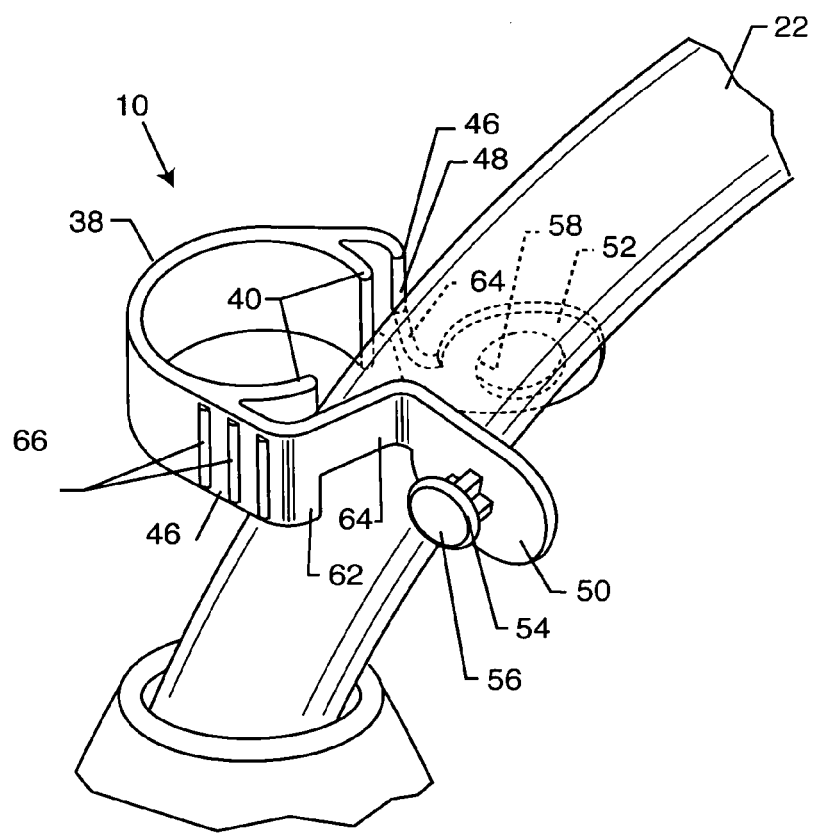
Figure 8:
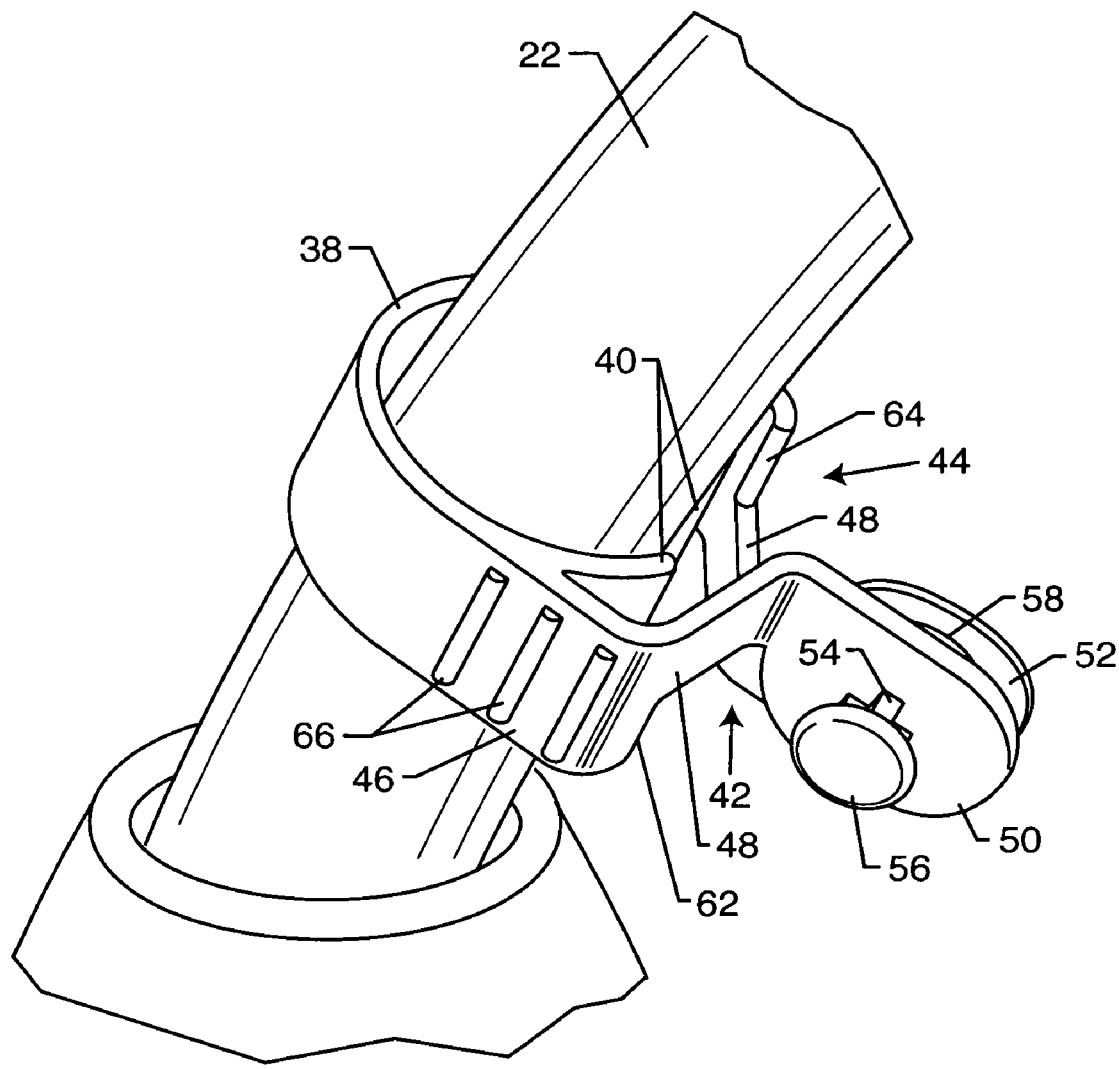

In the as-molded configuration as viewed in FIGS. 2–3, the hose clasp 10 is in an unlocked position with the lock members disengaged and wherein the outboard segments 50, 52 of the first and second clasp arms 42, 44 can be separated for placement of the hose clasp onto the supply hose 22 or the like. That is, as illustrated in FIGS. 6–8, these outboard segments 50, 52 can be spread apart by appropriate manipulation thereof, to accommodate pass-through reception of the supply hose 22 and further between the collar free ends 40, to position the split collar 38 wrapped about the supply hose 22. Importantly, the natural or unstressed as-molded geometry of the split collar 38 defines a generally circular bore 60 (FIG. 3) for relatively free or unrestricted sliding fit reception onto the supply hose. In the installed position as viewed in FIG. 8, the outboard ends 50, 52 of the two clasp arms 42, 44 return by inherent resilient or spring characteristics of the plastic material to substantially face-to-face abutting relation.

Figure 9:
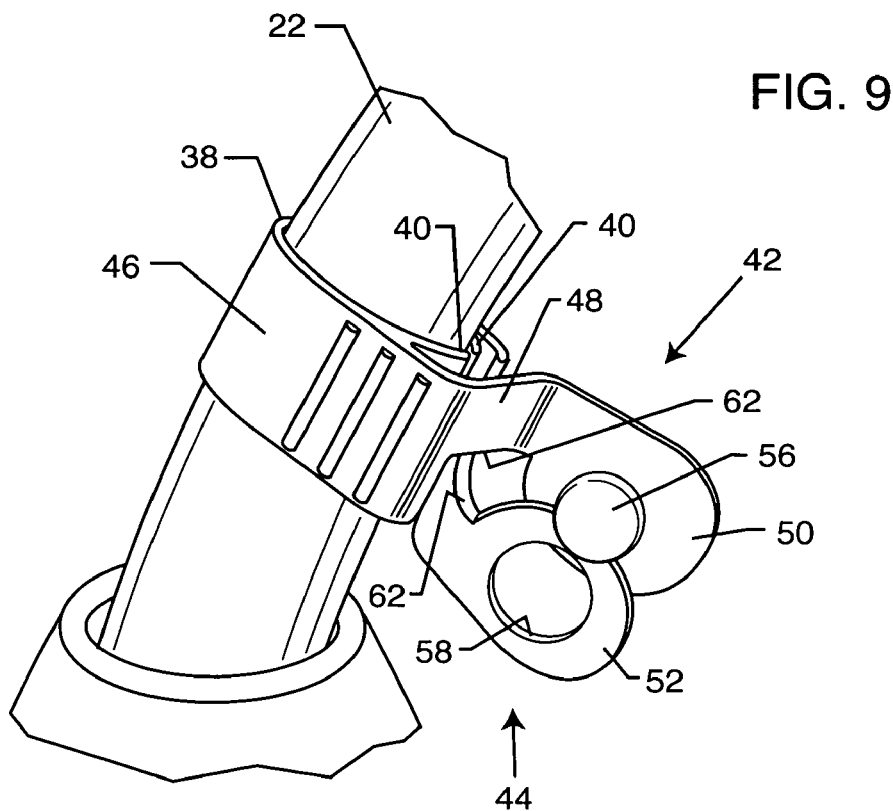
FIG. 9 is a fragmented perspective view showing an initial step for shifting the hose clasp from a normal unlocked position to an interlocked position.

The two clasp arms 42, 44 are adapted for inversion or displacement to a crossed over and interlocked position, as illustrated in FIG. 9. In this regard, the intermediate segments 48 of the two clasp arms 42, 44 are notched to accommodate such cross-over displacement, with the outboard clasp arm ends 50, 52 repositioned in a positionally reversed, substantially face-to-face relation. More particularly, the intermediate segment 48 of the first clasp arm 42 defines a downwardly open notch 62, whereas the intermediate segment 48 of the second clasp arm 44 defines an upwardly open notch 64, as viewed best in FIG. 9.

The clasp arms are shifted to the positionally reversed or inverted, interlocked or lockingly engaged position by lifting the first clasp arm 42 upwardly relative to the second clasp arm 44, and then shifting the outboard segment 50 of the first clasp arm 42 to a position behind the associated outboard segment 52 of the second clasp arm 44. This shifting movement may be accomplished conveniently and easily as a one-handed operation by using the thumb and forefinger for respectively grasping outwardly protruding ribs 66 formed on the outboard faces of the inboard clasp arm segments 46, and then moving the thumb and forefinger with a motion similar to snapping the fingers. The first clasp arm 42 is thus lifted to shift the outboard segment 50 thereof to the opposite side of the outboard segment 52 on the second clasp arm 44, with the respective notches 62, 64 interengaged for generally realigning the outboard segments 50, 52 with each other. In this cross-over interlocked position, the boss 54 and cap 56 on the first clasp arm 42 are receivable into and through the lock port 58 on the second clasp arm 44.

Figure 4:
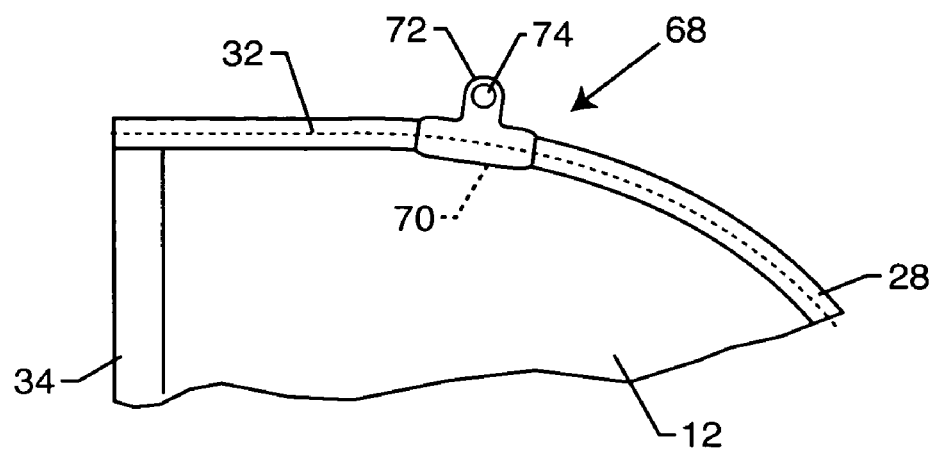
FIG. 4 is an enlarged fragmented side elevation view depicting an upper portion of an exemplary filter bag, including a leash member in the form of a ported tab.
Figure 5:
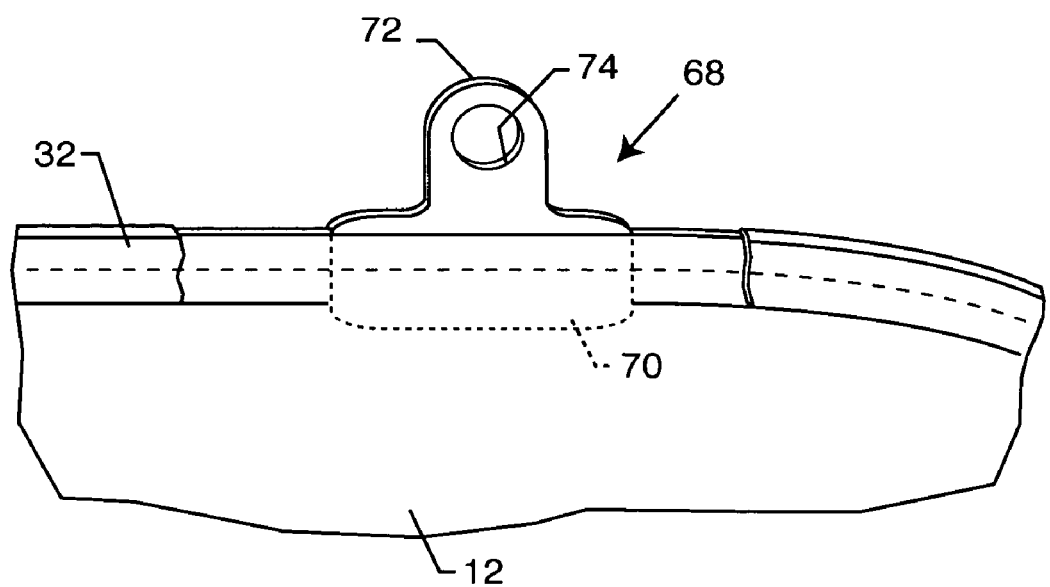
FIG. 5 is a further enlarged fragmented side elevation view of an exemplary filter bag including the ported tab leash member, and showing one preferred form of mounting the ported tab onto the filter bag.
Figure 10:
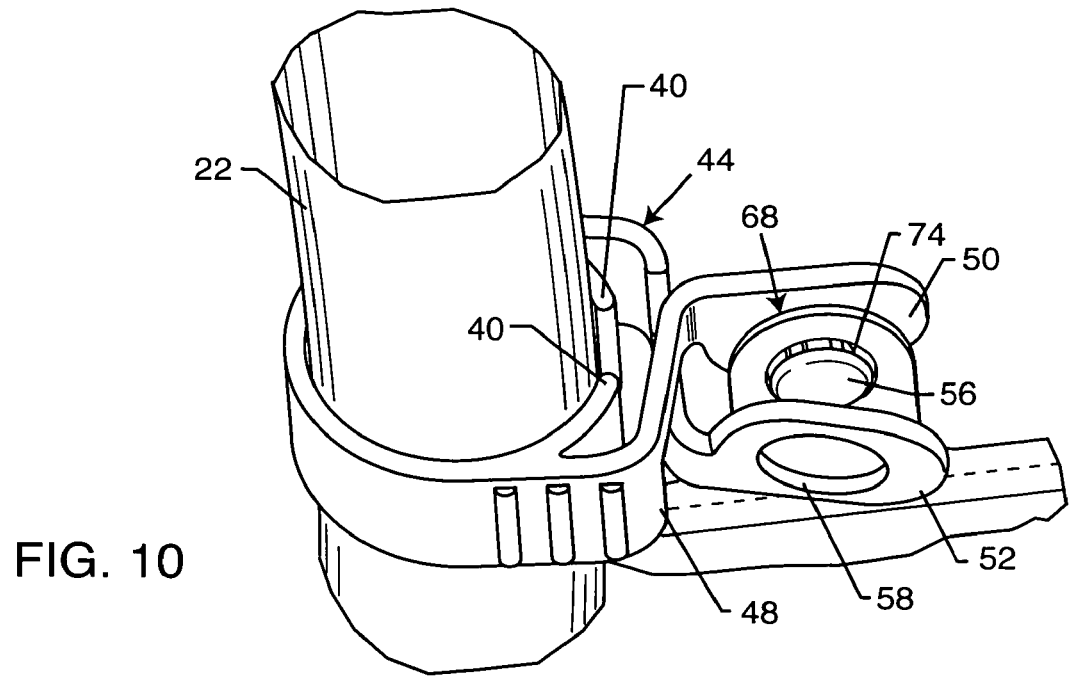
FIG. 10 is a fragmented perspective view illustrating a further step in shifting the hose clasp to the interlocked position, including connection to the ported tab on a filter bag.
Figure 11:
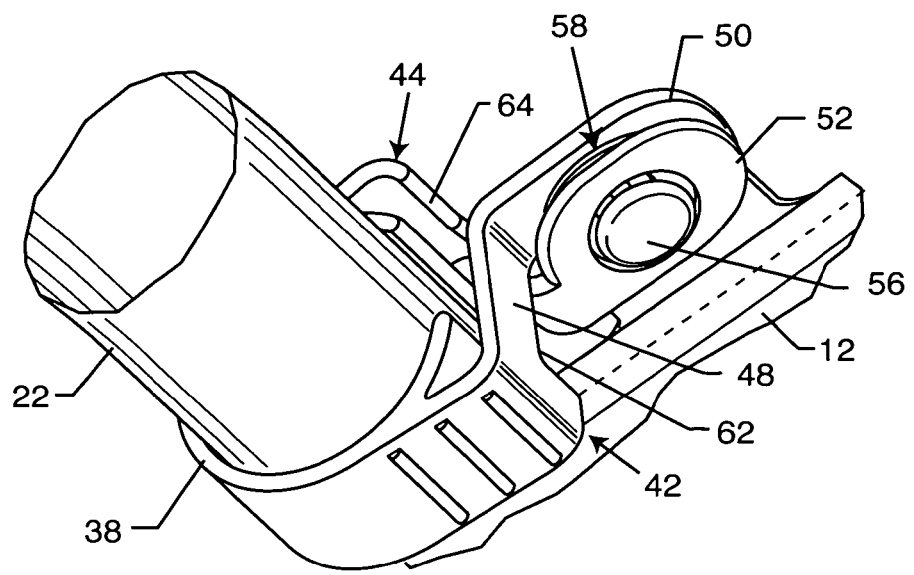
FIG. 11 is a fragmented perspective view similar to FIG. 10, and showing the hose clasp in the interlocked position and connected to the ported tab on a filter bag.
Figure 12:
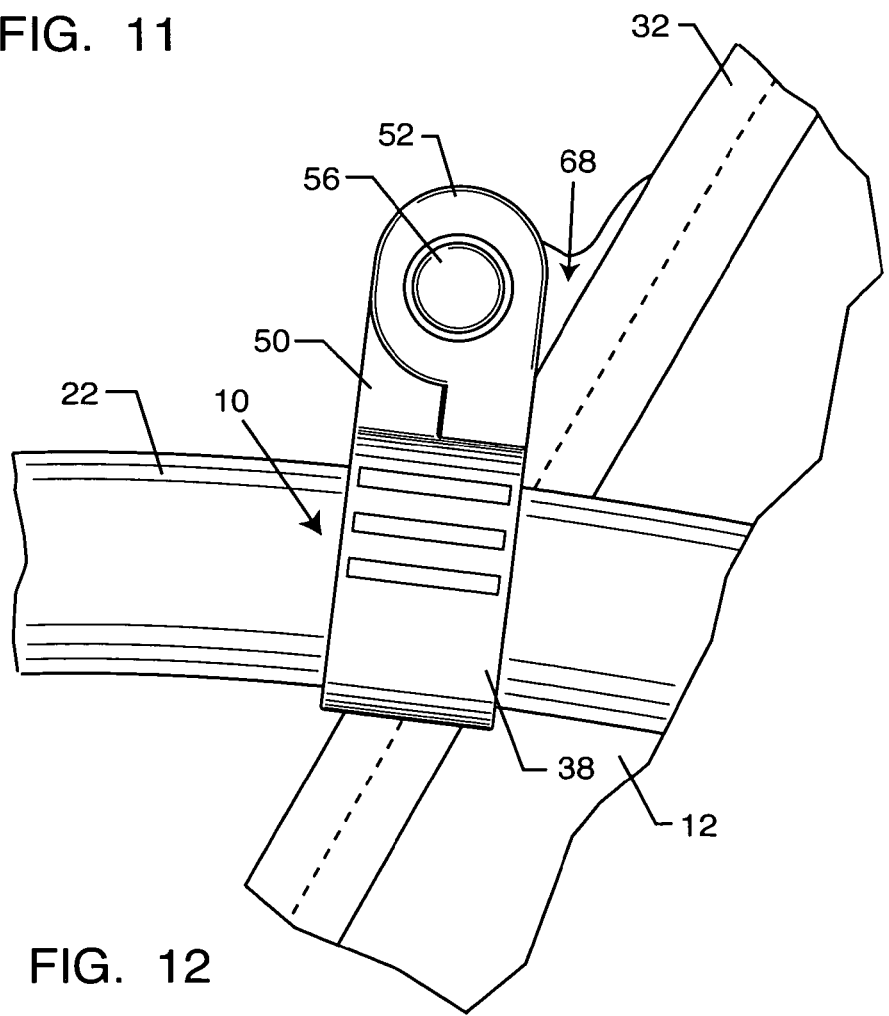
FIG. 12 is a fragmented side elevation view showing the hose clasp in the interlocked position and connected to the ported tab on a filter bag.

Concurrently with shifting the clasp arms 42, 44 to the interlocked position, a leash member 68 carried by the filter bag 12 is positioned between the clasp arm outboard segments 50, 52, for removably locked engagement therewith. In the preferred form as shown best in FIGS. 4–5, the leash member 68 may comprise a tab formed from plastic or the like to include a base portion 70 integrated as by sewing with the upper seam or margin 32 of the filter bag, and an upwardly projecting head 72 having an open port 74 formed therein. Alternately, the tab 68 may be formed as an integral portion of the filter bag 12, or it may comprise an alternative structure such as a loop or strap carried by the filter bag. In any case, the leash member or tab 68 is interposed between the outboard segments 50, 52 of the clasp arms 42, 44 by fitting the boss 54 and enlarged cap 56 through the leash member port 74, prior to reception of the boss 54 and cap 56 through the lock port 58. The tab 68 is thus securely retained between the outboard segments of the clasp arms 42, 44, with the enlarged cap 56 engaging one side face of the outboard segment 52 to substantially preclude accidental or inadvertent return movement to the unlocked position (FIGS. 10–12). In addition, in the interlocked position, the inherent spring characteristics of the molded plastic material beneficially urges the outboard segment 50 of the first clasp arm 42 laterally toward the outboard segment 52 of the second clasp arm 44, thereby securely clasping or clamping the leash tab 68 therebetween.

When it is desired to remove the filter bag 12 from the pool cleaner 14, the leash tab 68 is quickly and easily disassembled from the hose clasp 10 by shifting the clasp arms 42, 44 at least partially toward the unlocked position. More particularly, the boss 54 and associated cap 56 can be manually retracted and separated from the lock port 58 formed in the second clasp arm 44, as by squeezing the inboard segments 46 of the clasp arms toward each other, to open the outboard segments 50, 52 sufficiently to permit the ported tab 68 on the filter bag 12 to be slidably removed from the boss 54. Full return cross-over displacement of the clasp arms 42, 44 to the unlocked position may occur, but is not required. Such disassembly of the filter bag tab 68 from the hose clasp 10 also does not require disassembly of the hose clasp from the supply hose 22. Following filter bag removal from the hose clasp 10, the spring characteristics of the molded plastic clasp material will again return the boss 54 to the interlocked position extending through the lock port 58.

The thus-removed filter bag 12 can then be transported by a suitable disposal site for discarding of the debris collected within the filter bag, followed by re-assembly of the same or a replacement filter bag 12 with the pool cleaner suction mast 24 and with the hose clasp 10. Re-assembly may be accomplished quickly and easily by manually squeezing the clasp arms 42, 44 sufficiently to manually retract and separate the boss 54 from the lock port 58 sufficiently to permit re-attachment of the ported tab 68 with the boss 54. Subsequent release of the clasp arms 42, 44 is accompanied by return spring-biased displacement of the boss 54 to the interlocked position extending through the lock port 58, thereby re-attaching the filter bag 12 to the hose clasp 10.

A variety of further modifications and improvements in and to the improved hose clasp bag 10 of the present invention will be apparent to those persons skilled in the art. Accordingly, no limitation on the invention is intended by way of the foregoing description and accompanying drawings, except as set forth in the appended claims.

What is claimed is:

1. In combination:
   a pool cleaner;
   a filter bag for removable mounting onto said pool cleaner, said filter bag further including a leash member;
   a supply hose for coupling said pool cleaner to a flow of water; and
   a support clasp for removably supporting said leash member relative to said supply hose;
   said support clasp including a split collar defining an open bore and a pair of free ends, said split collar being sufficiently resilient to accommodate separation of said free ends for mounting of said collar slidably onto said supply hose;
   said support clasp further including first and second clasp arms extending generally from said collar free ends, said first clasp arm including a generally radially outwardly projecting outboard segment having a laterally extending boss formed thereon, and said second clasp arm including a generally radially outwardly extending outboard segment having a laterally open lock port formed therein;
   said outboard segments of said first and second clasp arms being movable between an unlocked position in generally overlying face-to-face relation with said boss projecting in a direction away from said lock port, and a crossed over interlocked position with said boss projecting through said lock port, said boss being receivable through an open port defined by said leash member for retaining said leash member between said outboard segments of said first and second clasp arms when said clasp arms are in said interlocked position.

2. The combination of claim 1 wherein said boss further includes an enlarged cap thereon.

3. The combination of claim 1 wherein said clasp arms respectively include a pair of oppositely-opening notches formed therein to accommodate crossed over movement to said interlocked position.

4. The combination of claim 1 wherein said support clasp comprises a unitary plastic molding.

5. The combination of claim 1 wherein further including ribs formed on said collar to facilitate manual displacement of said first and second clasp arms between said unlocked and interlocked positions.

6. The combination of claim 1 said first and second clasp arms each comprises an inboard segment extending generally outwardly from said split collar generally adjacent a respective one of said free ends, an intermediate segment extending from said inboard segment generally in a direction toward the intermediate segment of the other clasp arm, and said outboard segment projecting generally radially outwardly from said intermediate segment, and further wherein said intermediate segments of said clasp arms respectively include a pair of oppositely-opening notches formed therein to accommodate crossed over movement to said interlocked position.

7. The combination of claim 1 wherein said leash member comprises a ported tab carried by said filter bag.

* * * * *